United States Patent [19]

Pei

[11] 4,043,318
[45] * Aug. 23, 1977

[54] SOLAR ENERGY COLLECTOR

[75] Inventor: Yu K. Pei, Toledo, Ohio

[73] Assignee: Owens-Illinois, Inc., Toledo, Ohio

[*] Notice: The portion of the term of this patent subsequent to Apr. 27, 1993, has been disclaimed.

[21] Appl. No.: 652,366

[22] Filed: Jan. 26, 1976

Related U.S. Application Data

[63] Continuation-in-part of Ser. No. 482,092, June 24, 1974, Pat. No. 3,952,724.

[51] Int. Cl.² .............................................. F24J 3/02
[52] U.S. Cl. ................................... 126/271; 165/166; 215/13 R; 237/1 A
[58] Field of Search ................ 126/270, 271; 165/166; 215/13 R; 237/1 A; 29/197, 194, 195

[56] References Cited

U.S. PATENT DOCUMENTS

| | | | |
|---|---|---|---|
| 980,505 | 1/1911 | Emmet | 126/271 |
| 1,172,247 | 2/1916 | Anders | 215/13 R |
| 3,920,413 | 11/1975 | Lowery | 126/270 |
| 3,952,724 | 4/1976 | Pei | 126/271 |

Primary Examiner—Kenneth W. Sprague
Assistant Examiner—James C. Yeung
Attorney, Agent, or Firm—J. R. Nelson

[57] ABSTRACT

The disclosed invention relates to a solar energy collector in a conversion system. The collector is made from common glass tubing lengths of different diameters and comprises a first outer clear glass cylindrical tube closed at one end, and a glass absorber tube inside the first tube having an energy absorbing coating on its exterior surface. The absorber tube resembles an oversized test tube in that one end is closed. The absorber tube is held in place inside the outer tube by a spacer-support means engaging the closed end of the absorber tube. The open end of the absorber tube is sealed to the inside of the wall of the outer tube, which is the longer of the two, and the space is evacuated. An open-ended fluid handling tube of glass is inserted into the absorber tube to guide working fluid issuing into the absorber tube near its closed end along the wall thereof and extract collected heat. Several of the energy collectors are detachably connected into a manifold for circulation of working fluid (air or water or the like) into the handling tube and receive working fluid flowing from the absorber tube. The manifold provides for collector tubes to depend on opposite sides as a module covering predetermined area of rooftop or like solar exposure. The working fluid carrying the energy is utilized in a heating or cooling system.

14 Claims, 8 Drawing Figures

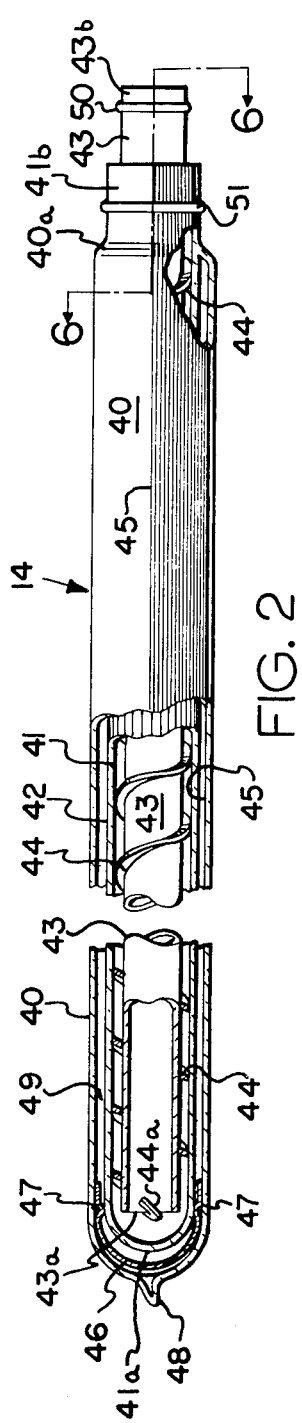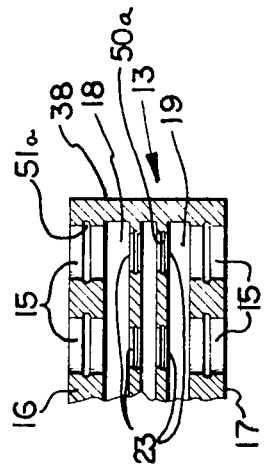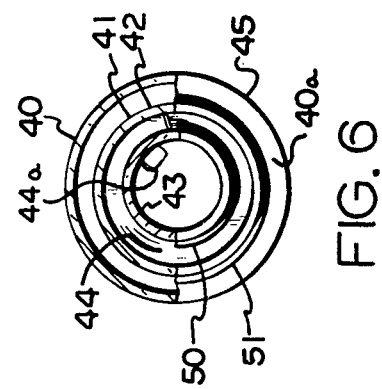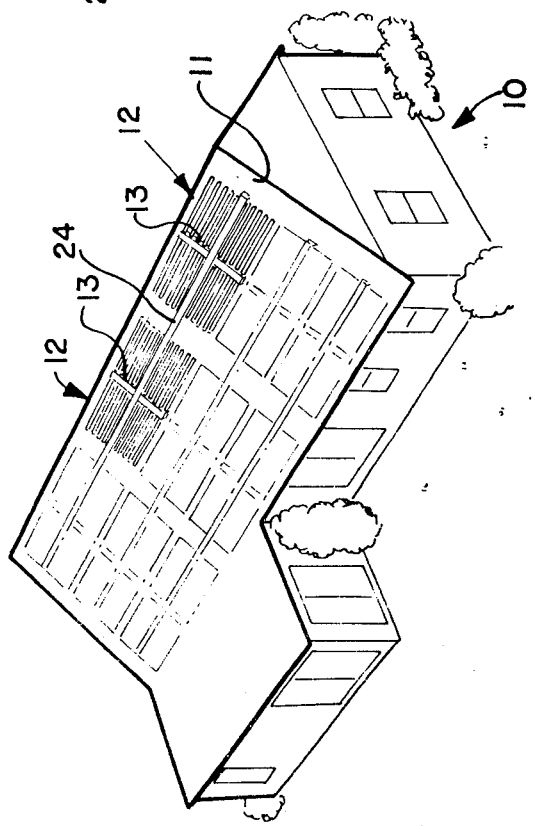

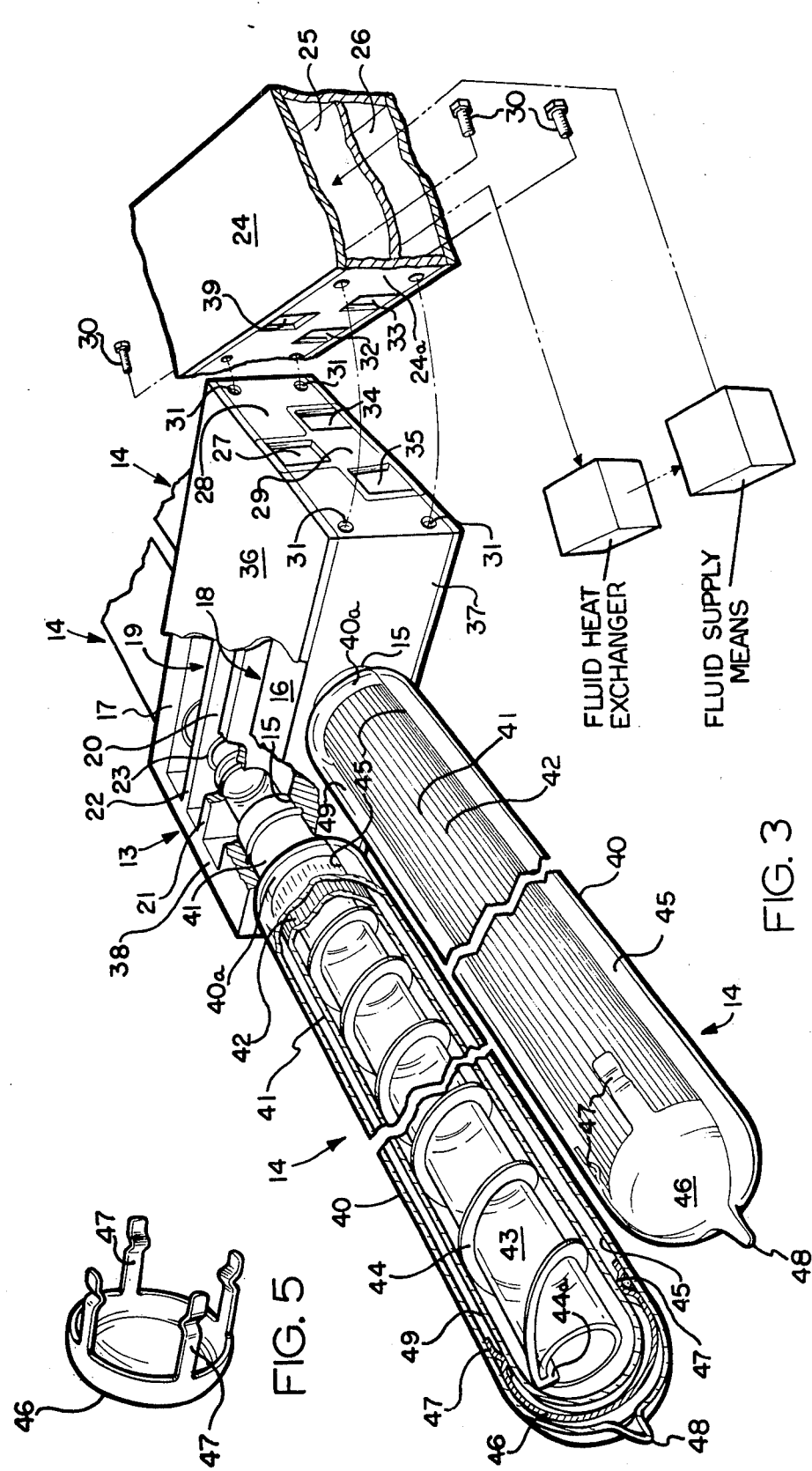

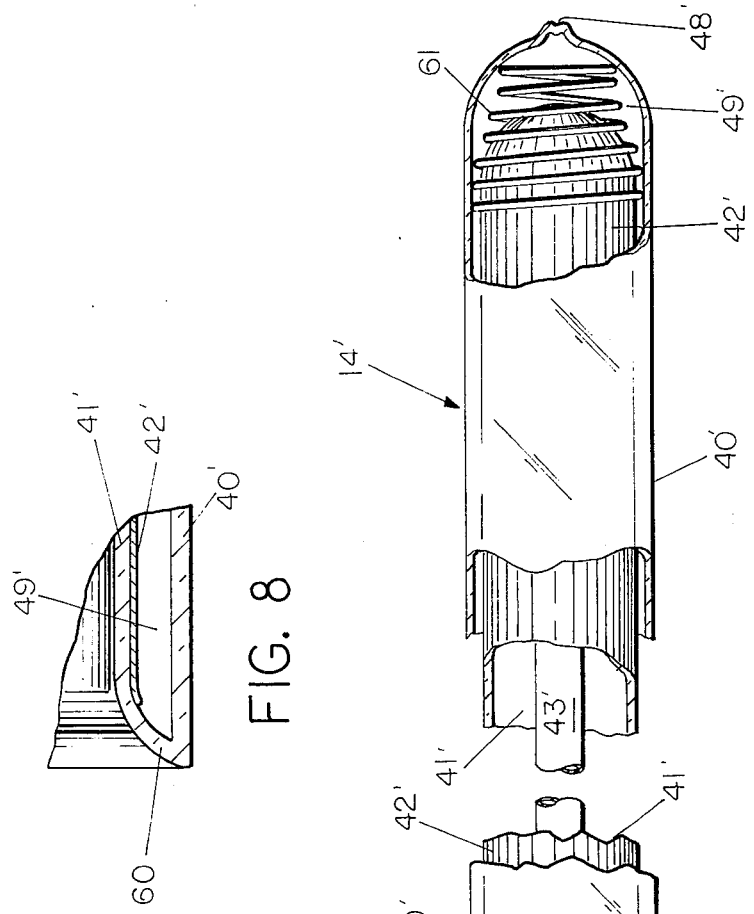
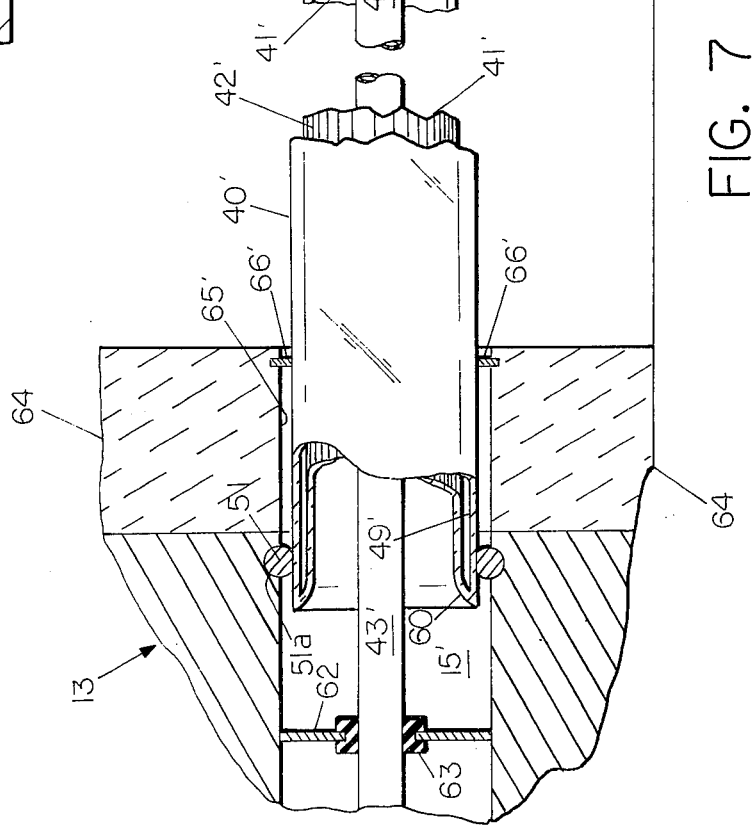

SOLAR ENERGY COLLECTOR

The present application is a continuation-in-part of my earlier copending application Ser. No. 482,092, filed June 24, 1974, and now U.S. Pat. No. 3,952,724.

The present invention relates to solar energy collectors. More specifically, the invention provides a relatively inexpensive and efficient unit for installation as a module or unit in a solar energy converter system.

SUMMARY OF THE INVENTION

The basic components of the energy collector unit for the system are made of glass of known tubular manufacture such as are prevalent today in the manufacture of glass tubing products, e.g. process glass pipe, or the like.

The tubular glass solar energy collectors are assembled onto a manifold such that the tubular collectors are detachably connected into a manifold. The manifold may be constructed for disposition of the collectors on either side thereof so as to extend laterally in rows along the manifold and provide an energy collecting system connected for either cooling or heating uses.

OBJECTS OF THE INVENTION

One of the important objects of the present invention is to provide a collector unit of low cost of manufacture and of operation. The collector unit may be mass produced of relatively inexpensive raw materials, the bulk of which is glass, and may be maintained in use or replaced easily.

Another important feature of the invention is the construction of the collector wherein the components comprised of three concentric tubes are made of glass. The two outermost tubes are constructed from glass tubing to resemble oversized test tubes in that their one end is closed. The outer tube is sealed to the intermediate inner tube and the space therebetween evacuated to a practical and efficient degree of vacuum to prevent heat loss through the space by convection and conduction heat loss. The intermediate inner tube is coated with an energy absorbing coating of high absorptance and low emittance. The third tube is placed inside the intermediate tube and is used to carry the fluid medium to the interior, closed end of the latter. The parts thus described, aside from the coatings, are of the same or similar composition of glass. The thermal expansion characteristics are similar and allow a glass-to-glass flame seal rather than a glass-to-metal gradient seal used in this type of collector heretofore, thereby avoiding failure from thermal expansion differences during operation. Additionally, the glass parts may be sealed one to the other more readily and with less cost in manufacture.

A further object of the invention is to provide a manifold for the fluid medium flow into and out of a plurality of the collector units connected thereto, and the collector units are provided with a quick disconnect and O-ring seal in a socket of the manifold for each collector unit.

Another object of the invention is to provide a spring support means connected to the interior end of the coated, intermediate absorber tube holding that end of the tube in concentric position in the outer tube, the other end of the absorber tube being sealed to the wall of the outer tube for support.

Other objects and advantages will become apparent from the following description in conjunction with the accompanying drawings.

BRIEF DESCRIPTION OF THE DRAWINGS

FIG. 1 is a perspective view showing the invention in use on the roof slope of a dwelling.

FIG. 2 is a side view, partly broken away and in section, of collector unit of the invention.

FIG. 3 is an exploded, perspective view, partly broken away and in section, showing a solar energy converter system module of the double manifold embodiment, wherein collector units extend on either side of the manifold.

FIG. 4 is a sectional plan view of a portion of the manifold of FIG. 3.

FIG. 5 is a perspective view of the end cap providing an inner end support means for the coated absorber tube of the collector inside the outer jacket tube.

FIG. 6 is a staggered sectional end view of the collector taken along line 6—6 on FIG. 2.

FIG. 7 is a side elevational view, partly broken away and in section, of a second embodiment of collector unit of the invention.

FIG. 8 is a fragmentary, enlarged sectional view of the fusion assembly of the glass absorber tube and the glass outer tube of the collector unit of FIG. 7.

DESCRIPTION

Shown on FIG. 1 is a typical in-use setting for the invention. The dwelling 10, such as a residence, has its roof section 11 located nearest the sun or most accessible to the sun, provided with plural modules 12 of the solar energy converter of the invention. The area selected for coverage by modules 12 may be left to the skill of the engineer and architect providing for the heating or cooling for the dwelling.

The Manifold

The module of the solar energy converter is shown in detail on FIG. 3. Module 12 which appears in part on the exploded view, comprises a central longitudinal manifold section 13 that extends down the roof section (FIG. 1). Extending outwardly from either side of the manifold 13 are plural collector units 14, to be presently described. The collectors 14 are of a plug-in type of connection into the side ports 15 spaced along the opposite vertical side walls 16 and 17 of manifold 13. Internally of manifold 13 are longitudinal passageways 18 and 19 running along the ports 15 on either side of the manifold. Sandwiched between passageways 18 and 19 is a central passageway 20 defined by the longitudinal interior vertical walls 21 and 22. Along walls 21 and 22 there are spaced apart ports 23. The ports 15 and 23 are matched as sets on the same central axis, i.e., the ports are coaxial.

The manifold 13 connects into a fluid handling system illustrated by the duct 24 having an upper conduit passage 25 and a lower conduit passage 26. The duct 24 extends between the heating or cooling system (labelled "Fluid Heat Exchanger" on FIG. 3) and the solar converter module 12. The passage 25 carries the relatively cool fluid medium, such as water, air or the like, and inroduces it through the matching aperture connection 39 in the vertical wall 24a of duct 24 and aperture 27 in the vertical end wall 28 of manifold 13. The aperture 27 connects into the central passageway 20 of manifold 13. The duct 24 and manifold 13 are connected and sealed together by the gasketed facing 29 held by cap screws 30 threaded into end wall 28 at 31. Gasket 29 may be any suitable compressible gasket material that will withstand elevated temperature service. Matching lower apertures 32 and 33 in wall 24a and 34 and 35 in wall 28 connect the respective passages 18 and 19 with the duct passage 26 for carrying the heated fluid medium coming from the collectors 14.

Manifold 13 is enclosed by top and bottom walls 36 and 37, respectively, and at its outer end by vertical wall 38.

The Collector Unit — First Embodiment

The collectors 14 shown on FIGS. 2 and 3 are all constructed alike, and each comprises an outer glass tube 40 that is of convenient length, say from 4 to 7 feet and of standard diameter, e.g. 2 inches O.D. A lower mirrored surface 45 may be employed to reflect radiant energy onto a portion of the absorber tube 41 of the collector.

The interior tube 41 is made of glass and is of somewhat lesser diameter and of slightly greater length. Tube 41 has its exterior surface precoated with an energy absorbing coating 42 having a high absorptance and low emittance. Examples of such wave length selective coatings are metallic undercoatings such as aluminum or silver deposited upon the glass surface, and a semi-conductor type coating is next deposited over the metallic surface coating to provide the wave length sensitivity desired. A high performance wave length selective coating is preferred having 0.8 or greater absorptance and 0.1 or lower infra red emittance.

Inside tube 41 there is a fluid delivery glass tube 43 for conveying relatively cool fluid medium into the collector interiorly of tube 41 and adjacent the closed end wall 41a thereof. The inner end 43a of delivery tube 43 is open (FIG. 2).

In assembly, the absorbing tube 41 already coated on the exterior with the wave length selective coating 42, is further provided with the snap-on end support cap 46 (FIG. 5) which provides inner end support means for tube 41 in tube 40. Cap 46 comprises a semispherical shell and multiple (either 3 or 4) legs 47. The cap 46 is made of metal or plastic having some resiliency to maintain its force fit on the inner end of tube 41. Tube 41 is then inserted into the outer tube 40 and in this first embodiment of the invention is fastened to outer tube 40 by fusing its open end onto tube 41 at the juncture 40a (FIG. 2). Thereafter, a vacuum is pulled through the opposite end of tube 40 at a tubulation and sealed off at the tip 48 in the manner known to those skilled in the art, the resultant sealed space 49 between the outer tube 40 and absorber tube 41 being highly evacuated; viz on the order of $10^{-4}$ torr of vacuum. Next the delivery tube is inserted interiorly of the absorber tube 41.

Each of the collector units 14 is detachably assembled into the manifold 13 as follows. The free end 43b of the delivery tube 43 is approximately the same O.D. as the diameter of the ports 23 in the interior walls 20 and 21 of the manifold. A rubber O-ring 50 is provided on free end 43b of the delivery tube to seal the latter in port 23. Similarly, free end 41b of the absorber tube is approximately the same O.D. as the port 15 in either of vertical side walls 16 or 17. A rubber O-ring 51 is provided on free end 41b of the absorber tube to seal it in port 15. The ports 15 and 23 are each provided with recess grooves 51a and 50a respectively, to receive the gasket O-rings 51 and 50 therein.

The Collector Unit — Second Embodiment

The collector construction shown on FIGS. 7 and 8 has similar parts labelled with corresponding numerals marked by a prime designation.

The collector 14' is comprised of a glass outer tube 40' that is transparent or clear and is closed at its one outer end in a sealed tubulation 48'. The opposite end of tube 40' is open. The interior tube 41' is made of glass tubing of somewhat lesser diameter and length. The interior glass tube 41' has its exterior surface precoated over substantially its length and periphery with the high absorptance and low emittance wave length selective coating 42' as described earlier herein under the first embodiment. Before the coating 42' is applied, preferably, the open end of glass tube 41' is worked to an outwardly flared end opening of the contour of the flared end 60 shown on FIGS. 7 and 8. The coating 42' is applied on the tube adjacent the flared end 60 to and inclusive of the closed end of tube 41'. Next, tube 41' is inserted into glass outer tube 40', a simple coil spring 61 being first assembled to fit on the closed end of tube 41' and bear against the closed end on the inside of outer tube 40'. At this stage of assembly, the tubulation at 48' is still open. With the tubes 40', 41' in place, as shown on FIG. 7, and spring 61 being somewhat compressed, the flared end 60 of tube 41' and the open end portion of tube 40' are heated and the glass fused together to form the integral end connection of the two tubes 40', 41', such as shown on FIG. 8. Thereafter, a vacuum is pulled through the opposite end tubulation at 48' of the outer tube 40' and sealed off at the tip 48' shown, which seals the space 49' between the outer tube 40' and the inner absorber tube 41' at a vacuum, preferably on the order of $10^{-4}$ torr or greater of vacuum. The coating 42' is thus contained within the vacuum of space 49'. A delivery tube 43' is inserted through a wall member 62 and annular rubber grommet 63 in a port 15' or 23' on one side or the other of the manifold 13, as described earlier herein. A rubber O-ring 51' is seated in a groove 51a' of the port 15' and compressed against the outer wall surface of tube 40' near the open end of the collector. The O-ring 51' forms the primary seal for the collector 14' in the manifold port.

Manifold 13 includes a layer of foamed insulation 64 around its exterior, exposed surfaces, and at locations corresponding to the collector ports in the manifold, the insulation layer includes formed ports 65 registering with the manifold ports. A thin washer-like seal 66 of flexible material is imbedded in the insulation within the bore of each of the ports 65 which annularly engage the periphery of the tube 40' thereby providing an outer seal in the ports.

The outer tube 40' is made of high transmittance and preferably low iron transparent glass. The inner absorber tube 41' is preferably of substantially the same glass composition as tube 40' for ease in the joining process and to reduce the residual stress at the fusion seal between the outer and inner tubes near their open ends.

Regarding the wave length selective coating layer 42' on glass tube 41', the coating comprises a substance having 0.80 or greater absorptance and a sub-coat having 0.1 or less emittance. For high absorptance as indicated, metallic compounds such as oxides or sulphides of chrome, nickel, copper or the like can be used with success. Sometimes a combination of metal and its compounds is best for the solar energy absorption. For low emittance as indicated, aluminum, silver, copper and gold are preferred as the sub-coat, the high absorption coating substances being superimposed thereover.

Any method of deposition of the coating substances selected must be capable of applying a controllable think film. Such methods used with success are vacuum deposition, chemical vapor deposition, ion-plating and sputtering.

In the invention, energy absorbing coatings not suitable in other types of collectors, such as flat plate collectors, may now be used because the coating is protected in the space 49' between the tubes at hard vacuum environment. Chemical attack by air and moisture or lack of bonding integrity are alleviated and no longer detrimental factors in the tubular solar energy collector herein disclosed.

The spacing means used between the closed ends of the inner and outer tubes 41', 40' of the collector can be of any design or material. The design criterion is that it must provide a firm support of the inner tube end to minimize the stress created at the opposite fused ends, or open ends of the tubes. It must allow the inner tube to expand or shrink according to its temperature without developing undue stress at the mentioned fused joint. Also, it must have preferably a minimum contact surface between the tubes and the spacing means to minimize heat loss by conduction, and it must also serve as a support during the sealing operation. As is disclosed herein, the spacing means may take the form of the snap-on clip 46 (FIG. 5) or the coil spring 61 (FIG. 7).

Because the spacer means is in the space to be evacuated to a hard vacuum, the material thereof used should not release gases after bake-out and tip-off of the outer tube 40 or 40' in the evacuating process. Also, the material of the spacer must be free of oily substance and organic bonding material, which would be be eliminated at a bake-out temperature for evacuation. Stainless steel properly cleaned is the preferred material.

Operation of the Collector Module

Utilizing the assembly shown on FIG. 3, and described earlier herein, a fluid medium, for example air, is pumped in duct 25 into central passage 20 of the manifold. The free ends 43b of the several collectors 14 communicate with passage 20 and are sealed therein so that the air flows lengthwise of the delivery tube 43 and exits at inner end 43a. Solar rays penetrate the upper glass of tube 40 and energy therefrom is absorbed by coating 42 of the absorber tube 41. The air circulated on the interior of tube 41 traverses the passage defined by helical baffle 44 and heat exchange therewith increases the temperature of the air as it travels toward the free end 41b of tube 41.

When heated air reaches the free end 41b of the tube connected thereat into either passageway 18 or 19, as the case may be, the heated fluid media flows into the lower duct 26 and is utilized to either heat or cool dwelling 10, or service hot water heating, or both.

One of the significant advantages of the system is experienced in the collector units 14 or 14' of the invention. Should any one of the collectors be damaged, break or malfunction, a replacement may be readily inserted and the defective unit removed, thereby maintaining the efficiency of the system.

The glass tubes of the unit are fabricated from known and standard glass shapes of either a soda-lime glass composition or a borosilicate glass composition. Both glasses are relatively inexpensive. The system and modules thereof may be assembled on the site of installation and need not be prefabricated at the factory and delivered to the site. The solar energy collector of this invention is simple to manufacture and assemble. Furthermore, it is lightweight; therefore, there is no need to further structure or reinforce the roof of the building where it is installed.

In use of the invention, the working fluid is deliverable from the collectors at a temperature in excess of 250° F. The energy absorbing coating 42 or 42' is totally protected and will last the lifetime of usage of the collector unit.

The module concept illustrated herein includes the preferred embodiment whereby collectors extend on both sides of the manifold — a "double acting" system. It is also within the scope of the invention to fabricate a "single acting" system wherein collectors extend only along the one side of the manifold. This may have some specialized uses, but, as stated, the double acting system is the preferred embodiment.

Other and further modifications may be resorted to without departing from the spirit and scope of the appended claims.

What is claimed:

1. A solar energy collector apparatus comprising an outer hollow, elongated tubular member of transparent glass, closed at its one end and open at its other end, a hollow, elongated tubular glass absorber member defining a glass wall of lesser O.D. than the I.D. of said outer member and closed at its one end and open at its other end, the absorber member having its exterior surface comprised of an energy absorbing coating applied thereon over a substantial portion of its axial length, said coating having high absorption and low emission properties, said absorber member being inserted within said outer member, resilient end support means engaging said closed end of the absorber member supporting it firmly in spaced relation to the interior surface of said outer member near the closed end of the latter and providing for expansion and contraction of the absorber member, an annular end portion of the glass at the open end of said absorber member being fused annularly onto the glass wall of the outer member, thereby sealing it to said outer member adjacent its other open end and closing an annular space therebetween, said space being evacuated, a heat exchange member communicating with the hollow interior of said absorber member, a fluid media supply means, and means connecting the supply means to the heat exchange member, whereby the fluid media absorbs the energy exchanged from the absorber member.

2. The solar energy collector apparatus of claim 1, wherein the annular end portion of glass adjacent the open end of said tubular absorber member is flared outwardly and fused integrally with the glass at the open end of said outer glass member.

3. The solar energy collector apparatus of claim 1, wherein the energy absorbing surface coating on the absorber member comprises a wave length selective coating having an absorptance of 0.80 or greater and an emittance of 0.10 or less.

4. The solar energy collector apparatus of claim 3, wherein said wave length selective coating comprises a sub-coating layer of a metal selected from a group consisting of aluminum, silver, copper and gold and an over-layer of a metallic compound selected from a group consisting of oxides and sulphides of chrome, nickel and copper including combinations thereof.

5. The solar energy apparatus of claim 1, wherein said outer member and said fluid handling member are each constructed of drawn, cylindrical glass tubing and said absorber member is constructed of cylindrical glass tubing having an opaque coating of said energy absorbing compound encircling the exterior surface thereof and said coating is contained within said evacuated space.

6. The solar energy collector apparatus of claim 1, wherein the resilient end support means comprises a coil spring axially compressed between said closed end of the absorber member and the closed end of the outer member.

7. A tubular solar energy collector comprised of a circumferentially transparent glass outer tube having a closed end and an open end and, interiorly of said outer tube, a hollow elongated glass tubular absorber member of a lesser O.D. than the I.D. of said outer tube and having a closed end and an open end and including a solar energy absorbing surface disposed between said ends thereof, a glass-to-glass fusion seal closing the opening between said absorber member and outer tube adjacent the open end of the outer tube to thus provide a closed space therebetween, said space being evacuated, said absorbing surface comprising an opaque wave length selective coating encircling the external peripheral glass surface of said tubular absorber member, said coating having an absorptance of 0.80 or more and an emittance of 0.1 or less.

8. The tubular solar collector of claim 7, wherein the open end of said tubular glass absorber member includes an outwardly flared end portion, said flared end portion being fused onto the glass wall of said outer tube thereby sealing the space between the outer tube and said interior tubular absorber member.

9. The tubular solar collector of claim 7, wherein said wave length selective coating comprises a wave length selective coating having an absorptance of 0.80 or greater and an emittance of 0.10 or less.

10. The tubular solar collector of claim 7, including means for supplying a working fluid to the absorber member in heat exchange relation therewith and extracting heat therefrom.

11. The solar energy collector of claim 10, wherein said means for supplying working fluid comprises a manifold sealingly connected to the open end of the outer tube for receiving heated working fluid from the absorber tube, a source of the working fluid connected to the manifold, a fluid circulation tube communicating with said manifold and the working fluid therein and extending interiorly of said absorber member to a location spaced from and adjacent to its closed end.

12. The solar energy collector of claim 11, wherein said fluid circulation tube is comprised of glass.

13. A solar energy collector apparatus comprising a first elongated, hollow transparent cylindrical glass tube having its one end closed and the other end open, a second elongated, hollow transparent cylindrical glass tube having its one end closed and the other end open and disposed within said first tube, the glass composition of both said glass tubes being substantially the same, a surface coating of energy absorbing material on the peripheral exterior surface area of said second tube, said coating having high absorptance and low emittance, means on the closed end of said second tube holding the second tube in spaced relationship to the first tube defining a space therebetween, means sealing the wall portion of the open end of the second tube onto the wall of the first tube, said means comprising an encircling, annular fusion of the glass at said open end of the second tube with the first tube enclosing a space therebetween, said space being evacuated, a source of working fluid, means for introducing working fluid into heat exchange relationship with the second tube, and means for conducting solar energy laden working fluid away from the collector apparatus.

14. The solar energy collector apparatus of claim 13, wherein the first and second glass tubes are formed from drawn glass tubing and the open end portion of the second tube includes an outwardly annular portion, said flared portion being fused onto the wall of the first tube adjacent the open end thereof.

* * * * *

UNITED STATES PATENT AND TRADEMARK OFFICE
CERTIFICATE OF CORRECTION

PATENT NO. : 4,043,318
DATED : August 23, 1977
INVENTOR(S) : Yu K. Pei

It is certified that error appears in the above-identified patent and that said Letters Patent are hereby corrected as shown below:

Column 5, line 6, "think" should be -- thin --.

Column 8, line 39, Claim 14, after "outwardly" insert -- flared --.

Signed and Sealed this

Eighteenth Day of April 1978

[SEAL]

Attest:

RUTH C. MASON
Attesting Officer

LUTRELLE F. PARKER
Acting Commissioner of Patents and Trademarks